United States Patent
Pendyala et al.

(10) Patent No.: US 12,407,576 B2
(45) Date of Patent: Sep. 2, 2025

(54) NRDU DATA PATH SIMULATION SERVER FOR TESTING DATA THROUGHPUT CAPACITY IN 5G COMMUNICATION NETWORK

(71) Applicant: Rakuten Symphony, Inc., Tokyo (JP)

(72) Inventors: Varun Pendyala, Bangalore (IN); Argha Mukherjee, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/023,568

(22) PCT Filed: Feb. 9, 2023

(86) PCT No.: PCT/US2023/062293
§ 371 (c)(1),
(2) Date: Feb. 27, 2023

(87) PCT Pub. No.: WO2024/144894
PCT Pub. Date: Jul. 4, 2024

(65) Prior Publication Data
US 2024/0223462 A1   Jul. 4, 2024

(30) Foreign Application Priority Data
Dec. 30, 2022 (IN) .............................. 202241076798

(51) Int. Cl.
*H04L 12/00* (2006.01)
*H04L 41/14* (2022.01)
(Continued)

(52) U.S. Cl.
CPC ........ *H04L 41/145* (2013.01); *H04L 43/0888* (2013.01); *H04L 43/50* (2013.01); *H04W 24/06* (2013.01)

(58) Field of Classification Search
CPC ... H04L 41/145; H04L 43/50; H04L 43/0888; H04W 28/0942; H04W 36/087; H04W 24/06
(Continued)

(56) References Cited

U.S. PATENT DOCUMENTS

| | | | |
|---|---|---|---|
| 2024/0223461 A1* | 7/2024 | Mukherjee | H04W 28/0942 |
| 2024/0244459 A1* | 7/2024 | Mukherjee | H04W 36/087 |
| 2024/0251263 A1* | 7/2024 | Mukherjee | H04L 43/50 |

FOREIGN PATENT DOCUMENTS

| | | | | |
|---|---|---|---|---|
| CN | 105636103 A | * | 6/2016 | H04W 24/06 |
| WO | WO-2024096917 A1 | * | 5/2024 | H04W 24/06 |

OTHER PUBLICATIONS

Written Opinion dated Jul. 12, 2023 in International Application No. PCT/US2023/062293.
(Continued)

*Primary Examiner* — Frantz Coby
(74) *Attorney, Agent, or Firm* — Sughrue Mion, PLLC (57) ABSTRACT

Embodiments are directed to a NRDU data path simulation server for testing data throughput capacity in 5G communication network. The NRDU data path simulation server includes a memory comprising a plurality of memory blocks, a processor and a communicator. The processor includes a test controller to receive testing profile for testing the data throughput capacity of NGCU, a DU simulator to generate multiple simulated DUs and multiple simulated UEs based on the testing profile. The processor includes traffic generators to generate multiple threads of data traffic for testing the data throughput capacity of the and a scheduler to schedule each thread to access entities of the simulated DU for optimizing the data throughput capacity and a UP controller to optimize the data throughput capacity of the
(Continued)

NRDU data path simulation server by converging a data path of the simulated UEs and a data path of the simulated DUs.

10 Claims, 7 Drawing Sheets

(51) Int. Cl.
    *H04L 43/0888*    (2022.01)
    *H04L 43/50*       (2022.01)
    *H04W 24/06*     (2009.01)

(58) Field of Classification Search
    USPC .......................................................... 370/241
    See application file for complete search history.

(56) References Cited

OTHER PUBLICATIONS

International Search Report dated Jul. 12, 2023 in International Application No. PCT/US2023/062293.

\* cited by examiner

NRDU DATA PATH SIMULATION SERVER FOR TESTING DATA THROUGHPUT CAPACITY IN 5G COMMUNICATION NETWORK

CROSS REFERENCE TO RELATED APPLICATIONS

The present application claims priority to and is the 35 U.S.C. § 371 United States National Phase application based on International Patent Application No. PCT/US23/62293, filed Feb. 9, 2023, and entitled "NRDU Data Path Simulation Server for Testing Data Throughput Capacity in 5G Communication Network" which claims priority to Indian Patent Application number 202241076798 entitled "NRDU Data Path Simulation Server for Testing Data Throughput Capacity in 5G Communication Network" filed Dec. 29, 2022, which are hereby incorporated by reference in their entireties.

FIELD OF INVENTION

The present disclosure relates to device testing and simulation, and more specifically related to a method and a new radio distributed unit (NRDU) data path simulation server for testing data throughput capacity in 5G communication network.

BACKGROUND

With advancement in technology, a number of users that are connected to a wireless communication network has increased manifold. Therefore, it is important to provide reliable and efficient operation of network functional elements to ensure high quality of service (QOS) to the users. In order to ensure the efficiency of the network functional elements network operators typically test the network functional elements using testing devices before deploying in a live wireless communication network.

The testing devices simulate various communication network conditions while testing the network functional elements which may include for example but not limited to, data traffic rate similar to real-time scenario, a number of user equipment or UEs capable of simultaneously registering/de-registering with the wireless communication network, simulating inter-/intra-mobile network equipment handover, transmitting bearer traffic, and/or combinations thereof. The testing of the network functional elements may be one of the three categories which includes functional correctness testing (e.g., protocol validation and compliance), inter-system compatibility and integration testing, and stress testing.

Generally, technologies like DPDK and fast data path are available but are not using Linux IP stack over socket-based interfaces (opensource tools that can achieve multi Gbps throughput over socket). Thus, it is desired to address the above issues.

OBJECT OF INVENTION

The principal object of the embodiments herein is to provide a method and a new radio distributed unit (NRDU) data path simulation server for testing data throughput capacity in 5G communication network. The proposed method optimizes data traffic in the NRDU data path simulation server to increase the data throughput capacity while testing a next generation central unit (NGCU) by incorporating various methods such as scheduling, use of timer, memory allocation to individual threads, minimized context searching, etc. Therefore, the proposed method provides a real-time environment for data tariff testing in the 5G communication network. The proposed optimization allows application development and deployment without overhead and dependency of fast path libraries (viz. DPDK) along with their drivers on Linux.

SUMMARY

Accordingly, embodiments herein disclose a new radio distributed unit (NRDU) data path simulation server for testing data throughput capacity in 5G communication network. The NRDU data path simulation server includes a memory comprising a plurality of memory blocks, a processor and a communicator. The processor includes a test controller configured to receive at least one testing profile for testing the data throughput capacity of a next generation central unit (NGCU) and a distributed unit (DU) simulator configured to generate a plurality of simulated DUs and a plurality of simulated user equipments (UEs) based on the at least one testing profile. Each simulated DU of the plurality of simulated DUs includes a plurality of entities based on the at least one testing profile. The processor also includes a traffic generator configured to generate a plurality of threads of data traffic required for testing the data throughput capacity of the NGCU, based on the at least one testing profile and an IP security Manager (IPSEC MGR) configured to simulate internet protocol (IPSEC) functionality between at least one simulated DU and the NGCU. Further, the processor includes a scheduler configured to schedule each thread of the plurality of threads to schedule access the plurality of entities of at least one simulated DU of the plurality of simulated DUs for optimizing the data throughput capacity of the NRDU data path simulation server: and a user plane (UP) controller configured to optimize the data throughput capacity of the NRDU data path simulation server.

In an embodiment, each thread of the plurality of threads is allocated at least one memory block of the plurality of memory blocks and the at least one memory block is released by each thread on completion of an operation associated with each thread.

In an embodiment, the plurality of entities includes an UP event processing engine for controlling internal signaling of the NRDU data path simulation server and wherein the UP event processing engine is configured to enable at least one flag associated with a Packet Data Convergence Protocol (PDCP) manager and a Service Data Adaptation Protocol data path (SDAP) manager sequentially for enabling a flow of at least one of the data traffic and a running thread through the NRDU data path simulation server.

In an embodiment, the scheduler includes a DP signaling event queue and a timer for timing at least one operation associated the plurality of entities and the access of data associated the plurality of entities sequentially.

In an embodiment, the UP controller is configured to converge a data path of the plurality of simulated UEs and a data path of the plurality of simulated DUs to optimize the data throughput capacity in the NRDU data path simulation server and the IPSEC MGR simulates the IPSEC functionality by encrypting at least one of a UP payload and a CP payload.

In an embodiment, the traffic generator is a downlink (DL) traffic generator which is a source of DL traffic and an end point of UL traffic or/and an uplink (UL) traffic generator which is a source of UL traffic and an end point of DL traffic.

Accordingly, embodiments herein disclose a method for testing data throughput capacity in 5G communication network using a new radio distributed unit (NRDU) data path simulation server. The method includes receiving, by the NRDU data path simulation server, at least one testing profile associated with a next generation central unit (NGCU) and generating, by the NRDU data path simulation server, a plurality of simulated UEs and a plurality of simulated DUs based on the at least one testing profile. The method also includes generating, by the NRDU data path simulation server, a plurality of threads of data traffic required for testing the data throughput capacity of the NGCU, based on the at least one testing profile and scheduling, by the NRDU data path simulation server, each thread of the plurality of threads to access the plurality of entities of at least one simulated DU of the plurality of simulated DUs without contention between the plurality of threads. The method then includes testing, by the NRDU data path simulation server, the data throughput capacity of the NGCU based on the generated plurality of threads of the data traffic.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein, and the embodiments herein include all such modifications.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, embodiments herein disclose a new radio distributed unit (NRDU) data path simulation server for testing data throughput capacity in 5G communication network. The NRDU data path simulation server includes a memory comprising a plurality of memory blocks, a processor and a communicator. The processor includes a test controller configured to receive at least one testing profile for testing the data throughput capacity of a next generation central unit (NGCU) and a distributed unit (DU) simulator configured to generate a plurality of simulated DUs and a plurality of simulated user equipments (UEs) based on the at least one testing profile. Each simulated DU of the plurality of simulated DUs includes a plurality of entities based on the at least one testing profile. The processor also includes a traffic generator configured to generate a plurality of threads of data traffic required for testing the data throughput capacity of the NGCU, based on the at least one testing profile and an IP security Manager (IPSEC MGR) configured to simulate internet protocol (IPSEC) functionality between at least one simulated DU and the NGCU. Further, the processor includes a scheduler configured to schedule each thread of the plurality of threads to schedule access the plurality of entities of at least one simulated DU of the plurality of simulated DUs for optimizing the data throughput capacity of the NRDU data path simulation server: and a user plane (UP) controller configured to optimize the data throughput capacity of the NRDU data path simulation server.

Accordingly, embodiments herein disclose a method for testing data throughput capacity in 5G communication network using a new radio distributed unit (NRDU) data path simulation server. The method includes receiving, by the NRDU data path simulation server, at least one testing profile associated with a next generation central unit (NGCU) and generating, by the NRDU data path simulation server, a plurality of simulated UEs and a plurality of simulated DUs based on the at least one testing profile. The method also includes generating, by the NRDU data path simulation server, a plurality of threads of data traffic required for testing the data throughput capacity of the NGCU, based on the at least one testing profile and scheduling, by the NRDU data path simulation server, each thread of the plurality of threads to access the plurality of entities of at least one simulated DU of the plurality of simulated DUs without contention between the plurality of threads. The method then includes testing, by the NRDU data path simulation server, the data throughput capacity of the NGCU based on the generated plurality of threads of the data traffic.

Unlike to the conventional methods and systems, the proposed method includes achieving higher throughput on traditional socket-based framework: without having dependency on an external fast path library (and associated drivers).

Unlike to the conventional methods and systems, the proposed method achieves multi Gbps throughput using socket-based interfaces. Further, the optimization is userspace based and can work on any SMP mode.

Unlike to the conventional methods and systems, the proposed method includes pool-based memory allocations and reuse of memory pools which contribute to the optimization. The communication channel is designed on a worker thread model in a run-to-completion model on a given socket.

Unlike to the conventional methods and systems, the proposed method provides socket buffer optimization (fine tuning socket options using setsockopt), optimizes kernel parameters via sysctl, lock-less worker threads for fast data forwarding, zero copy of data across shared memory buffers, specific to NDRU app—separation of signalling and data path and reuse of the memory pool from a flat buffer pool.

Referring now to the drawings, and more particularly to FIGS. 1 through 7, where similar reference characters denote corresponding features consistently throughout the figures, there are shown preferred embodiments.

Figure 1:
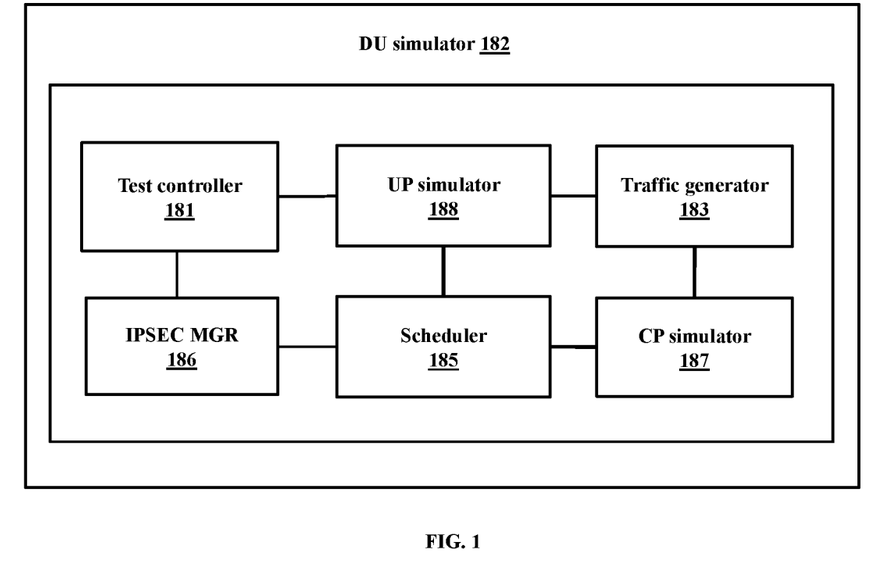
FIG. 1 illustrates a block diagram of new radio distributed unit (NRDU) simulator/DU simulator of a NRDU data path simulation server for testing data throughput capacity in 5G communication network, according to an embodiment as disclosed herein.

FIG. 1 illustrates a block diagram of new radio distributed unit (NRDU) simulator (182)/DU simulator (182) of a NRDU data path simulation server (100) for testing data throughput capacity in 5G communication network, according to an embodiment as disclosed herein.

The NRDU data path simulation server (100) for example can include multiple distributed unit (DU) simulators (182) each of which includes multiple entities. The multiple entities in the DU simulators (182) can be for example but not limited to test controller (181), a traffic generator (183), a scheduler (185), a IPSEC MGR (186), CP simulator (187) and a UP simulator (188).

In an embodiment, the test controller (181) is configured to receive a testing profile for testing the data throughput capacity of the NGCU (190). The testing profile is provided by a user and the testing profile may include for example but not limited to, a number of UEs to be simulated, a traffic profile for each simulated UE, a number of DUs to be simulated, number of cells, number of sectors within each of the cells, routes for connecting each of the cells and channel conditions to be simulated.

In an embodiment, the UP simulator (188) is configured to generate a plurality of simulated DUs and a plurality of simulated user equipments (UEs) based on the testing profile. Here, each simulated DU of the plurality of simulated DUs includes a plurality of entities based on the testing profile. The plurality of entities can be for example but not limited to, general packet radio service (GPRS) tunnelling Protocol (GTP) manager (182a), F1U (182b) (connects the NGCU (190) to a NRDU), Packet Data Convergence Protocol (PDCP) manager (182c) and Service Data Adaptation Protocol (SDAP) manager (182d). The plurality of entities of the simulated DU includes an UP-event processing engine (182e) each for controlling internal signaling of the NRDU data path simulation server (100). The UP-event processing engine is configured to enable a flag associated with the PDCP manager (182c) and the SDAP manager (182d) sequentially for enabling a flow of the data traffic or a running thread through the NRDU data path simulation server (100).

In an embodiment, the traffic generator (183) is configured to generate a plurality of threads of data traffic required for testing the data throughput capacity of the NGCU (190) based on the received testing profile. The traffic generator (183) may be a downlink (DL) traffic generator which is a source of DL traffic and an end point of UL traffic or an uplink (UL) traffic generator which is a source of UL traffic and an end point of DL traffic.

In an embodiment, the scheduler (185) is configured to schedule each thread of the plurality of threads to access the plurality of entities of the simulated DU of the plurality of simulated DUs for optimizing the data throughput capacity of the NRDU data path simulation server (100). Here, each thread is allocated a memory block of the multiple memory blocks and the memory block is released by each thread on completion of an operation associated with each thread. The scheduler includes a data path (DP) signalling event queue and a timer for timing an operation associated the plurality of entities and the access of data associated the plurality of entities sequentially.

In an embodiment, the IPSEC MGR (186) is configured to simulate internet protocol (IPSEC) functionality between the simulated DU and the NGCU (190). The IPSEC MGR (186) simulates the IPSEC functionality by encrypting at least one of a UP payload and a CP payload.

In an embodiment, the CP simulator (187) is a control path simulator for signalling.

Figure 2:
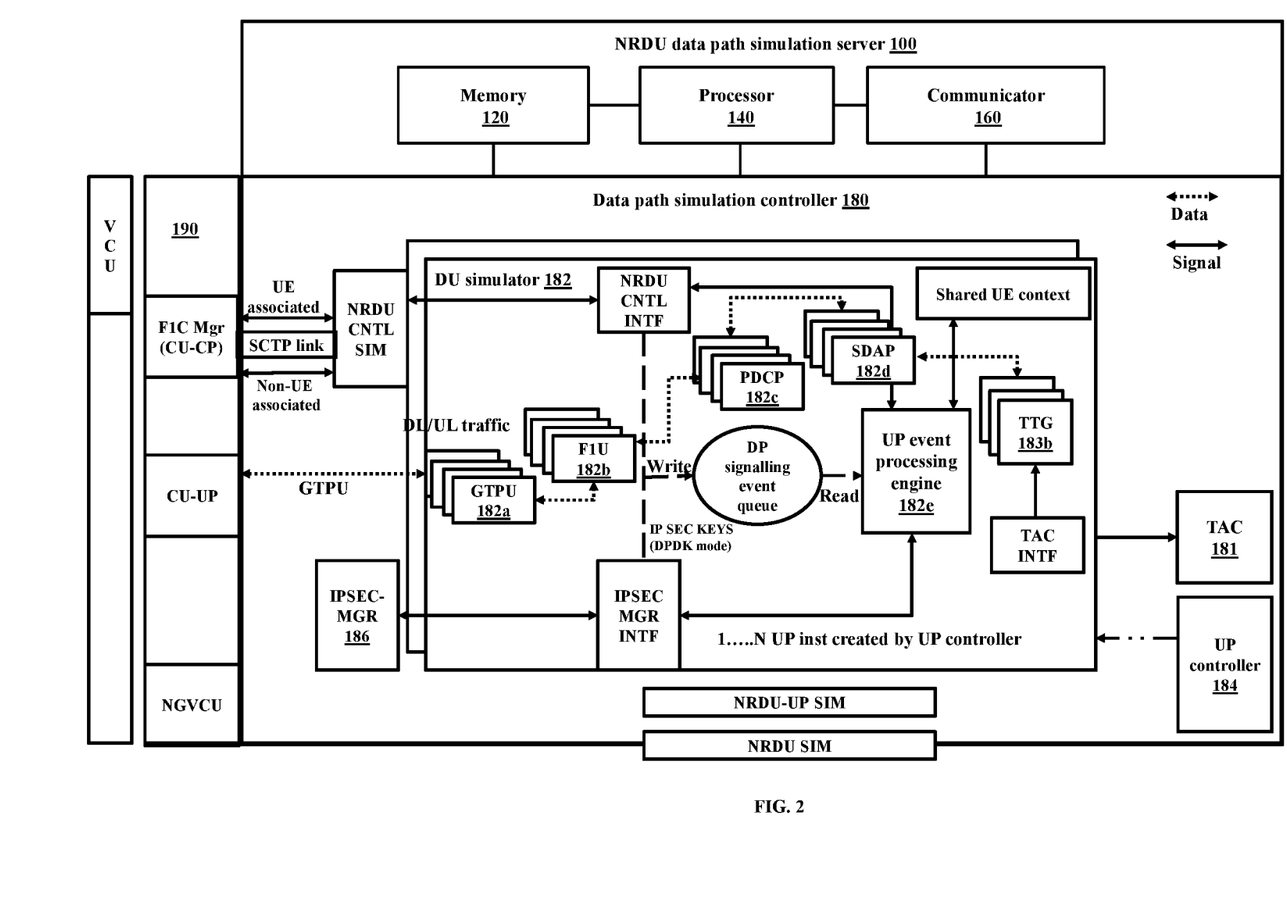
FIG. 2 illustrates NRDU data path simulation server for SA mode deployment, according to an embodiment as disclosed herein.

FIG. 2 illustrates NRDU data path simulation server (100) for SA mode deployment, according to an embodiment as disclosed herein.

In an embodiment, the NRDU data path simulation server (100) includes a memory (120), a processor (140), a communicator (160) and a data path simulation controller (180).

The NRDU data path simulation server (100) can be for example any device which is used for testing a device under test (DUT) i.e., a next generation central unit (NGCU) (190).

The data path simulation controller (180) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductors. The NRDU data path simulation server (100) provides the combination of the DU U-Plane stack (F1U protocol on top of GTP) and the UE U-Plane protocol stack, starting from the PDCP, the SDAP. The FIG. 2 indicates the data path simulation controller (180) out of the processor (140). However, the data path simulation controller (180) can be incorporated within the processor (140) or as part of any other processor/processors or can in itself be a processor.

The design is made in such a way that to reduce multiple hopping retaining to the complete functionality of UE and DU to test CU throughput capacity. The NRDU data path simulation server (100) is implemented such that the DU data path, the RU and the UE data plane protocol Stack combinedly.

Referring to the FIG. 2, the NRDU data path simulation server (100) in the SA mode deployment is used to test the NGCU data throughput capacity in Uplink and Downlink direction. The Datapath simulation application is also called UPSIM (User plane Data Traffic Simulator).

The UP controller (184) is configured to optimize the data throughput capacity of the NRDU data path simulation server (100) by converging a data path of the plurality of simulated UEs and a data path of the plurality of simulated DUs.

The NRDU data path simulation server (100) includes multiple DU simulators (182a-N), each of which includes multiple entities to enhance the data throughput in the NRDU data path simulation server (100). Therefore, the NRDU data path simulation server (100) is capable of being scaled up based on the requirement. Consider the first DU simulator (182a) which includes the GTP manager (182a), the F1U (182b), the PDCP manager (182c), the SDAP manager (182d), the UP-event processing engine (182e), the traffic generator (183) and the scheduler (185) (not specifically shown in the FIG. 2).

The NRDU data path simulation server (100) will simulate the data path from the UL side and will also be the termination point of the DL traffic at the traffic generator (183). Since the data path throughput needs to be tested the multi-Gbps traffic is required, unlike the case with the signalling path testing where the traffic capacity may be low.

Regular socket APIs are not capable of providing the multi-Gbps traffic required for testing the data path throughput in the NRDU data path simulation server (100). Unlike to the conventional methods and systems, the NRDU data path simulation server (100) is capable of generating the multi-Gbps of traffic and also simultaneously receive the multi-Gbps traffic i.e., bi-directional multi-Gbps of traffic.

The NRDU data path simulation server (100) simulates DU, RU and UE traffic for multi-Gbps traffic with socket API. The proposed NRDU data path simulation server (100) can be scaled up by addition of resources such as for example adding another VM will enable horizontal scaling of the simulator. Therefore, the data throughput will eventually increase due to the horizontal scaling.

Further, the NRDU data path simulation server (100) does not require a dedicated core for execution as required in conventional applications. The NRDU data path simulation server (100) application executes on the core as and when it gets time slice for execution on the core. This is based on the scheduling of the worker threads by the scheduler (185) which intelligently provides access to each of the entities.

The NRDU data path simulation server (100) is a bundle of applications where one application needs to communicate to the other application. In the NRDU data path simulation server (100), NRDU control SIM (187) provides instructions to the NRDU data path simulation server (100) for providing the DL traffic and UL traffic. The same is indicated through the signal path in the FIG. 6.

The UP event processing engine (182e) is a thread which is also executed on the first DU simulator (182a). Therefore, the UP event processing engine (182e) can also access the GTP manager (182a), the F1U (182b), the PDCP manager (182c) an, the SDAP manager (182d). Since the first DU simulator (182a) already includes the DL thread and the UL worker thread which are accessing the GTP manager (182a), the F1U (182b), the PDCP manager (182c) and the SDAP manager (182d) there could be a contention for accessing between the DL thread, the UL worker and the UP event processing engine (182e). The NRDU data path simulation server (100) avoids the contention between the threads by using the timer. The context will use in sequential manner. The timer will trigger and push an event to the UP-event processing engine (182e). The UP-event processing engine (182e) enables certain flags in the data path. However, the data path is indicated by a different thread.

Sequential access: consider stack scenario. Here the thread accesses the SDAP manager (182d) based on the input from the UP event processing engine (182e). If it is an SMP then the data path thread will read the change in the flag after a delay of a few micro-seconds or nano seconds and then work based on the raised flag associated with the event.

Since the data path thread is a free running thread which keeps on updating, the data path thread will not be able to always push the event to the stack. Therefore, the UP-event processing engine (182e) is used to send the timer towards the DP signalling event queue which will push an event to the queue. The event is read by the UP event processing engine (182e) and enables a flag at the PDCP manager (182c). The PDCP manager (182c) will determine the raised flag after a buffer time and will further change the memory location at which the stack is written. Therefore, the memory location at which the stack was written before enabling the flag at the PDCP manager (182c) becomes a backup memory. The UP event processing engine (182e) can access the backup memory after the buffer time to access the existing stack. Therefore, the complete flow is written in a different buffer after the flag is enabled based on the timer. Therefore, the scheduler (185) intelligently schedules the threads to avoid contention and access the data sequentially and not at the same time.

The UL and DL worker threads act on different data and not on the same data at any given period of time. Further, the UL thread, the DL thread and the UP-event processing engine (182e) are all free running threads and does not include a locking mechanism.

The memory (120) of the NRDU data path simulation server (100) comprises multiple memory pools. Each memory pool is mapped to a corresponding entity of the plurality of entities of the NRDU data path simulation server (100). The memory pool is dynamically mapped to an entity and the data in the memory pool of the entity keeps changing. The data in the memory pool is changing and the memory pool does not get deleted.

The UP-Sim Application Co-ordinates with the IPsec manager (186). C-plane Application Simulation stack and the TTG (183b) for internal signalling to support the Data Plane Processing. For Example: C-plane application simulator informs the NRDU data path simulation server (100) about the bearer addition, PDU Session etc., so that the NRDU data path simulation server (100) stores this information to act on the need accordingly to support the Data Plane Throughput Capacity Testing.

The NRDU data path simulation server (100) includes the converged UE Data path and DU data path into the NRDU data path simulation server (100) to avoid multiple hop for data. It reduces data path processing and optimizes the throughput. The NRDU data path simulation server (100) includes the worker model. However, the NRDU data path simulation server (100) does not use core pinning to the worker and hence provides better flexibility and optimal core usage. For example, consider that the testing profile requires 60) simulated DUs, the specific number of threads required for the simulation of the 60 DUs may not be precisely known and hence the core pinning may not be able to increase the optimization in the NRDU data path simulation server (100). Consider that 4 threads are required to support any traffic of the UP application then say out of the 8 threads 4 are mapped to the UP application and hence only 4 more threads are available for other applications. Further, a dependency is created that more than I core is always required. Hence, the dependency scenario reduces optimization of the data throughput rate. Therefore, in the absence of the core pinning the proposed NRDU data path simulation server (100) provides higher flexibility and reduces the resource requirement.

The NRDU data path simulation server (100) memory is provided in an array pattern where there is no requirement for searching for the data. Therefore, the context searching is in order of 1. The NRDU data path simulation server (100) includes an indexer (not shown in the FIG. 6) which is configured to generate identifiers such as UE ID, tunnel ID, etc. The indexer will provide free identifiers from a list of identifiers based on a limit of the array. Therefore, there is no requirement to perform context searching across the contexts and also throughout the array. As a result, the performance of the NRDU data path simulation server (100) is drastically enhanced.

The internal schedular (185) is provided in the server (100) to access data in intelligent fashion so that there is no requirement of locking in data path worker threads. Also, the NRDU data path simulation server (100) provides sequential access of the shared data using intelligent timer approach. The NRDU data path simulation server (100) includes socket buffer optimization. The optimal buffer is taken which will not create low resource in the environment and provides storage for multi-Gbps traffic.

The NRDU data path simulation server (100) ensures network/socket specific kernel parameter optimization with changes from core side. But the kernel core is not changed. The network/Socket specific kernel parameter is an exported parameter to the NRDU data path simulation server (100). This provides space in the kernel to store the incoming packets. In conventional design of the socket API is added to the interface which does not support multi-Gbps throughput. There will be multiple interrupts and ISR routines which will be called which eventually reduce the CPU throughput and utilize more cores which is a drawback of the socket API. The NRDU data path simulation server includes a networking stack, using the network/Socket specific kernel parameter the networking stack is optimized.

The NRDU data path simulation server (100) includes worker specific memory pool implementation and segregation of the memory (120) for each worker thread as there is no contention. Here, the memory pool is attached to the worker/entity (i.e., the individual simulated DUs). The memory blocks or chunks will not return back to the memory pool unless the entire operation is terminated or stopped. Therefore, the allocated memory will keep on being reused by that specific simulated DU. The reuse of the memory (120) again and again per worker thread ensures the optimal usage of the cache. The memory (120) which is frequently used is always inside the cache.

The memory (120) includes a plurality of memory blocks or memory chunks which are allocated to each thread of a plurality of threads and the memory block is released by each thread on completion of an operation associated with each thread. Therefore, the memory blocks are reused by individual threads until the operation associated with the thread is halted. The memory (120) is configured to store instructions to be executed by the processor (140). The memory (120) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) can be configured to store larger amounts of information. In certain examples, a non-transitory storage medium may store data that can, over time, change (e.g., in Random Access Memory (RAM) or cache).

The processor (140) communicates with the memory (120), the communicator (160) and the data path simulation controller (180). The processor (140) is configured to execute instructions stored in the memory (120) and to perform various processes. The processor may include one or a plurality of processors, may be a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (160) includes an electronic circuit specific to a standard that enables wired or wireless communication. The communicator (160) is configured to communicate internally between internal hardware components of the NRDU data path simulation server (100) and with external devices via one or more networks.

At least one of the plurality of modules/components of the data path simulation controller (180) may be implemented through an AI model. A function associated with the AI model may be performed through memory (120) and the processor (140). The one or a plurality of processors controls the processing of the input data in accordance with a predefined operating rule or the AI model stored in the non-volatile memory and the volatile memory. The predefined operating rule or artificial intelligence model is provided through training or learning.

Here, being provided through learning means that, by applying a learning process to a plurality of learning data, a predefined operating rule or AI model of a desired characteristic is made. The learning may be performed in a device itself in which AI according to an embodiment is performed, and/or may be implemented through a separate server/system.

The AI model may consist of a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning process is a method for training a predetermined target device (for example, a robot) using a plurality of learning data to cause, allow, or control the target device to make a determination or prediction. Examples of learning processes include, but are not limited to, supervised learning, unsupervised learning, semi-supervised learning, or reinforcement learning.

Although the FIG. 2 shows various hardware components of the NRDU data path simulation server (100) but it is to be understood that other embodiments are not limited thereon. In other embodiments, the NRDU data path simulation server (100) may include less or more number of components. Further, the labels or names of the components are used only for illustrative purpose and does not limit the scope of the invention. One or more components can be combined together to perform same or substantially similar function of the NRDU data path simulation server (100).

Figure 3:
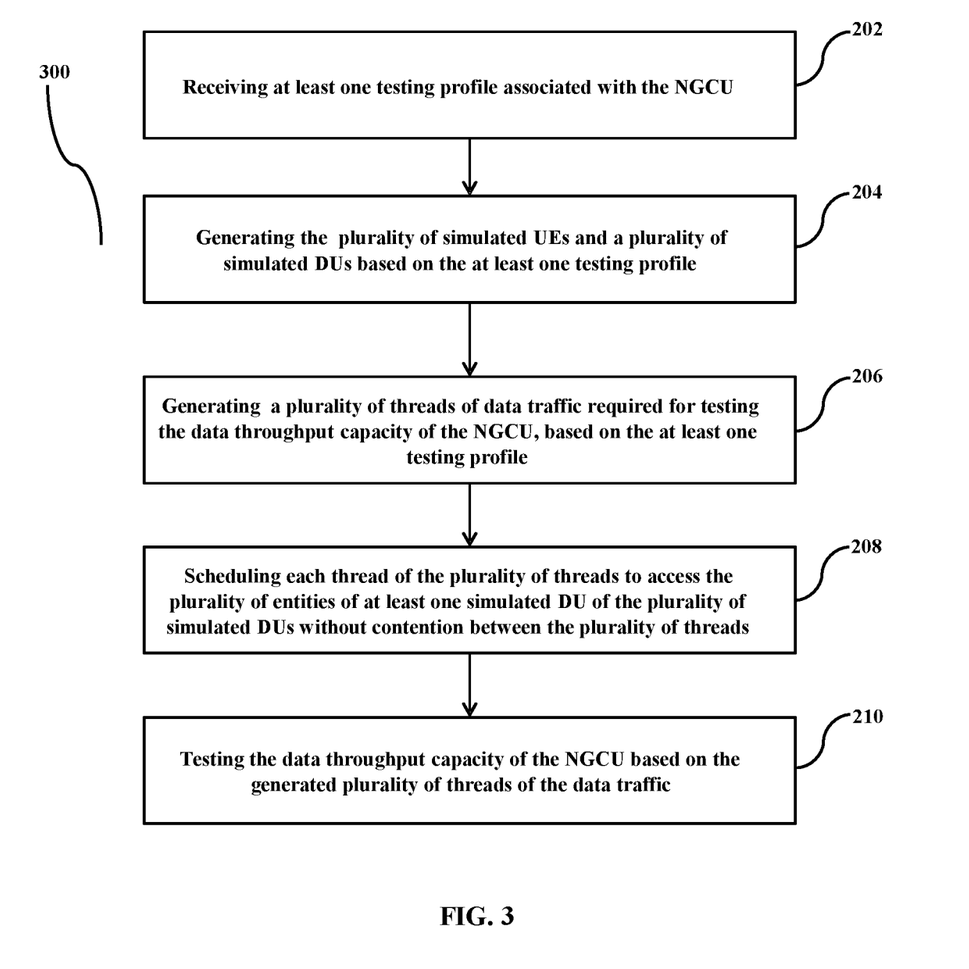
FIG. 3 is a flow diagram illustrating a method for testing data throughput capacity in the 5G communication network using the NRDU data path simulation server, according to an embodiment as disclosed herein.

FIG. 3 is a flow diagram (300) illustrating a method for testing data throughput capacity in the 5G communication network using the NRDU data path simulation server (100), according to an embodiment as disclosed herein.

Referring to the FIG. 3, at step 202, the method includes the NRDU data path simulation server (100) receiving the at least one testing profile associated with the NGCU (190). For example, in the NRDU data path simulation server (100) described in the FIG. 2, the data path simulation controller (180) is configured to receive the at least one testing profile associated with the NGCU (190).

At step 204, the method includes the NRDU data path simulation server (100) generating the plurality of simulated UEs and the plurality of simulated DUs based on the at least one testing profile. For example, in the NRDU data path simulation server (100) described in the FIG. 2, the data path simulation controller (180) is configured to generate the plurality of simulated UEs and the plurality of simulated DUs based on the at least one testing profile.

At step 206, the method includes the NRDU data path simulation server (100) generating the plurality of threads of data traffic required for testing the data throughput capacity of the NGCU, based on the at least one testing profile. For example, in the NRDU data path simulation server (100) described in the FIG. 2, the data path simulation controller (180) is configured to generate the plurality of threads of data traffic required for testing the data throughput capacity of the NGCU, based on the at least one testing profile.

At step 208, the method includes the NRDU data path simulation server (100) scheduling each thread of the plurality of threads to access the plurality of entities of at least one simulated DU of the plurality of simulated DUs without contention between the plurality of threads. For example, in the NRDU data path simulation server (100) described in the FIG. 2, the data path simulation controller (180) is configured to schedule each thread of the plurality of threads to access the plurality of entities of at least one simulated DU of the plurality of simulated DUs without contention between the plurality of threads.

At step 210, the method includes the NRDU data path simulation server (100) testing the data throughput capacity of the NGCU (190) based on the generated plurality of threads of the data traffic. For example, in the NRDU data path simulation server (100) described in the FIG. 2, the data path simulation controller (180) is configured to test the data throughput capacity of the NGCU (190) based on the generated plurality of threads of the data traffic.

The various actions, acts, blocks, steps, or the like in the flow diagram (300) may be performed in the order presented, in a different order or simultaneously. Further, in some embodiments, some of the actions, acts, blocks, steps, or the like may be omitted, added, modified, skipped, or the like without departing from the scope of the invention.

Figure 4:
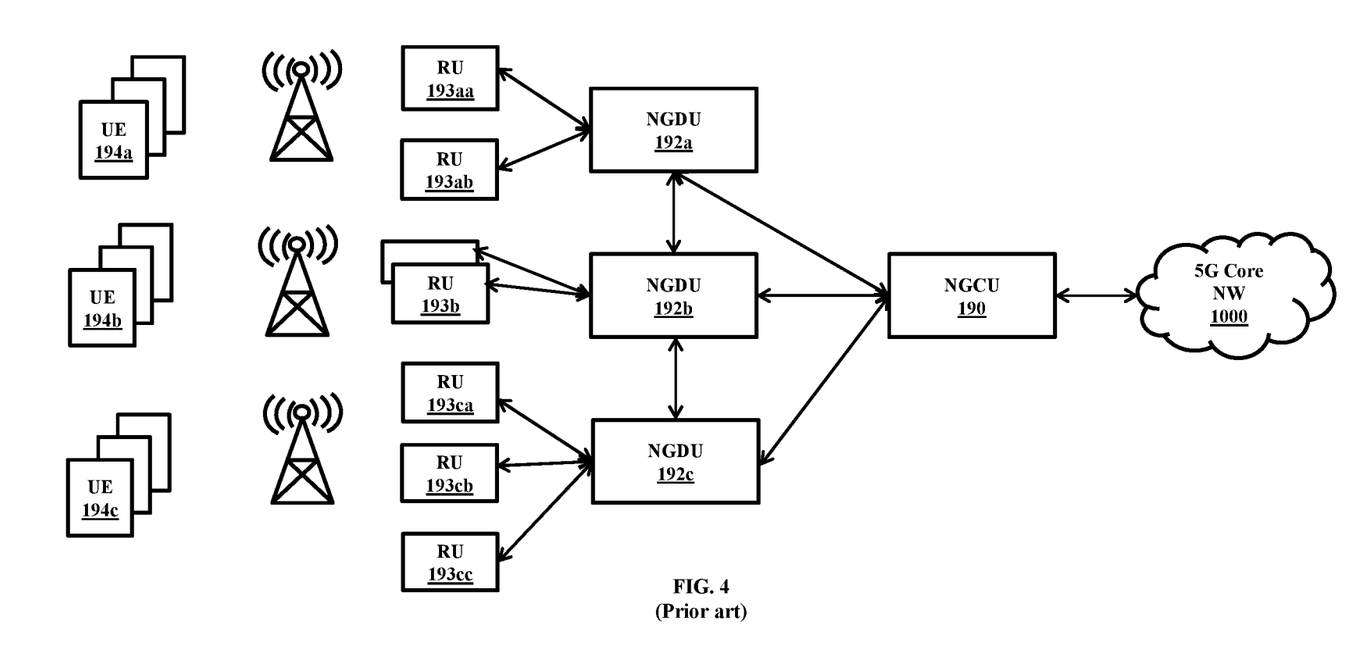
FIG. 4 illustrates an example 5G network which needs to be simulated, according to an embodiment as prior art.

FIG. 4 illustrates an example 5G network which needs to be simulated, according to an embodiment as prior art.

Referring to the NGCU (190) is the DUT. To be able to test the end-to-end functionality and throughput capacity of the NGCU (190) other components such as a 5G-Core (1000), multiple NGDUs (192a-c), multiple RUs (193a-c) connected to the multiple NGDUs (192a-c) and multiple UEs (194a-c) connected to each of the multiple RUs (193a-c) are to be simulated by the NRDU data path simulation server (100). Here, one NGCU (190) can be connected to the multiple NGDUs (192a-c) and each NGDU (192a) is connected to the multiple RUs (193a-c). Each RU (193a) covers a physical geo-graphical area to service mobile phones (UEs) (194a-c).

A downlink data path is from the NGCU (190), to the at least one NGDU (192a), to the at least one RU (193aa), to the specific UE (194a) connected to the at least one RU (193aa). In the uplink data path, the UE (194a) will generate the traffic which goes to the RU (193aa) followed by the NGDU (192a), the NGCU (190) which gets terminated in the PDN/5GC (1000).

Figure 5:
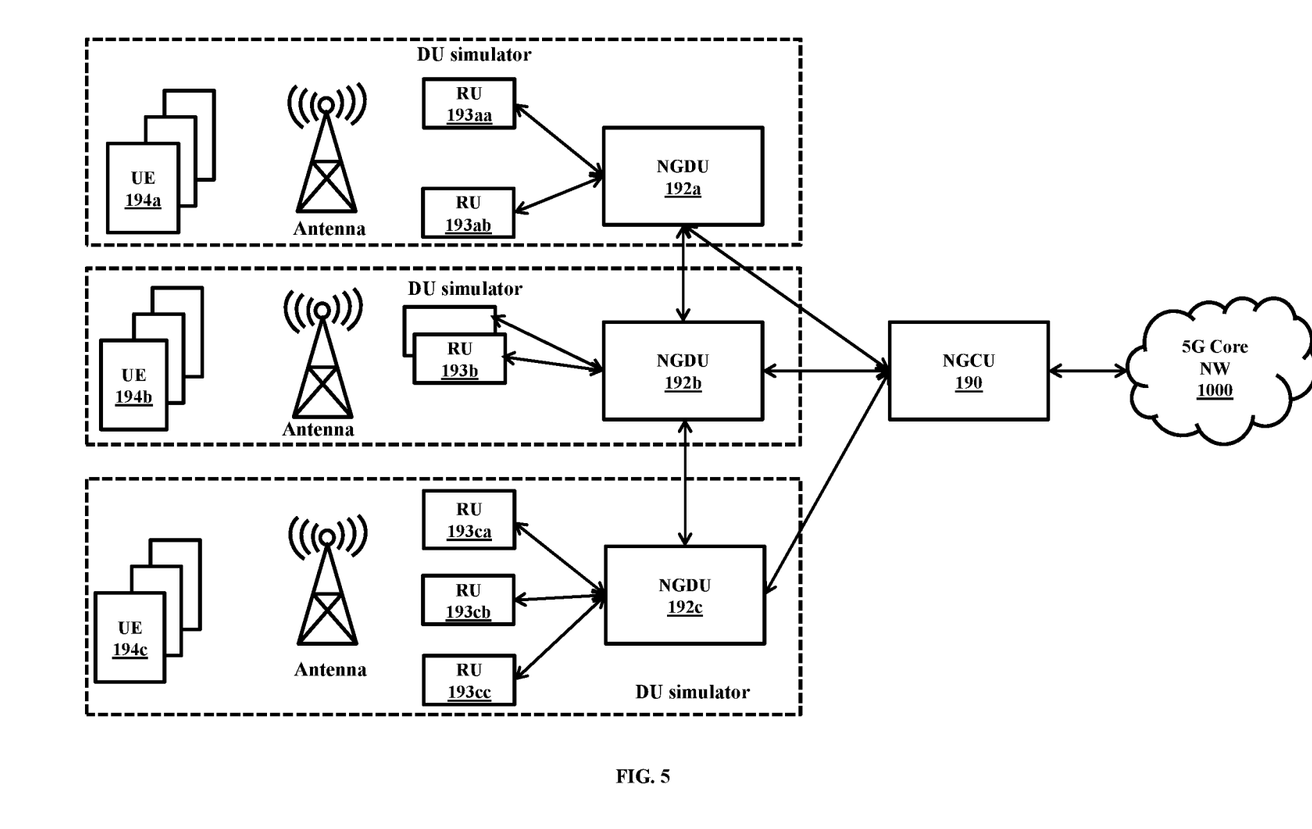
FIG. 5 illustrates an example of multiple DU simulators used to test the NGCU in the 5G network, according to an embodiment as disclosed herein.

FIG. 5 illustrates an example of multiple DU simulators used to test the NGCU (190) in the 5G network, according to an embodiment as disclosed herein.

To ensure the efficiency of any network functionality such as for example, the NGCU (190) needs to be tested before deploying the NGCU (190) on the field in a live wireless communication network. However, the testing of the NGCU (190) requires simulation of the near-field scenario so that the NGCU (190) can be tested under real conditions.

The testing device must be designed such that it can simulate various conditions while testing the NGCU (190) such as for example but not limited to, data traffic rate similar to real-time scenario, a number of UEs capable of simultaneously registering/de-registering with the wireless communication network, simulating inter-/intra-mobile network equipment handover, transmitting bearer traffic, and/or combinations thereof. Here, the testing may include functional and capacity testing. Consider the capacity testing as the performance of any products would be evaluated based on the capacity and the sustainability of the product when subjected to larger loads of traffic here in the case of the NGCU (190).

Referring to the FIG. 5, in conjunction with the FIG. 3, any simulator such as the NRDU data path simulation server (100) which is used for testing the NGCU (190) would require to simulate the components and the conditions of the field scenario. Therefore, the components such as the multiple NGDUs (192a-c), the multiple RUs (193a-c) and the multiple UEs (194a-c) along with the signalling and data traffic needs to be simulated to achieve efficient and real-filed like testing of the simulator. In the FIG. 4, three DU simulators are used to create an example scenario of three NGDUs (192*a-c*) and the corresponding components.

Figure 6:
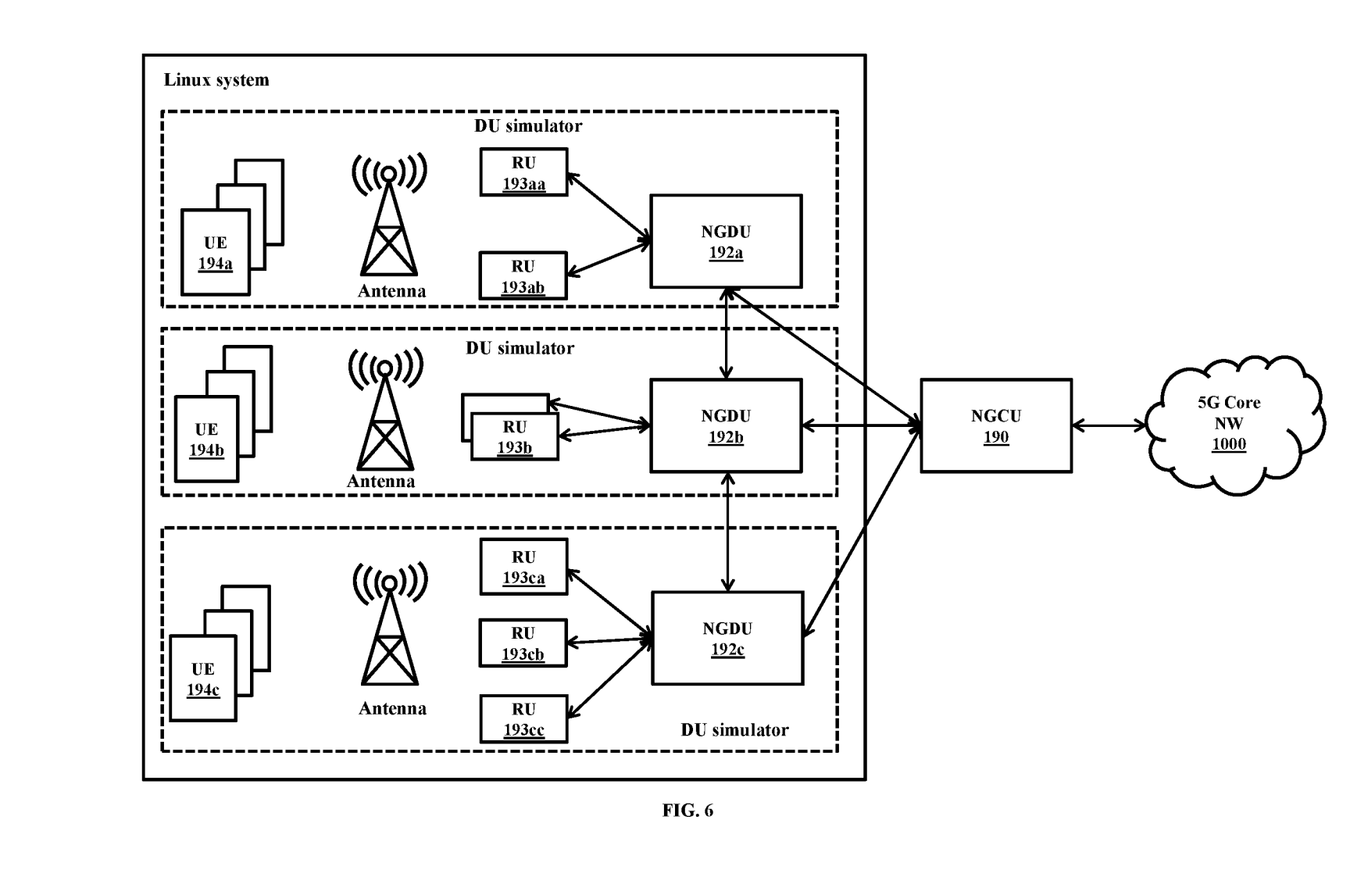
FIG. 6 illustrates an example of the multiple DU simulators used to test the NGCU run on a same Linux machine, according to an embodiment as disclosed herein.

FIG. 6 illustrates an example of the multiple DU simulators used to test the NGCU (190) run on a same Linux machine, according to an embodiment as disclosed herein.

Referring to the FIG. 6, the NRDU data path simulation server (100) is designed such that the data path supports the multi-Gigabyte parsing of traffic. The NGCU (190) is provided both for SA and ENDC set-up. If the NGCU (190) is to be tested then real DU, real RU and real radio are required. When a large number of DUs are to be tested then the number of real components required will be very large which makes the entire testing process costly and cumbersome. Therefore, from the NGCU (190) all south-bound node and components are simulated. The NRDU data path simulation server (100) should be capable of being deployed in any Linux server without any requirement of any additional modules or kernel change, as shown in the FIG. 6.

The proposed method of providing the data path can be deployed anywhere and is portable i.e., if the NRDU data path simulation server (100) is containerized the container can be deployed, if the NRDU data path simulation server (100) is provided as a virtual machine, then the VM can be deployed anywhere, therefore the NRDU data path simulation server (100) can be deployed in any kind of the Linux server.

The conventional methods and systems, usually modify the kernel or deploy a new kernel, etc. for providing the data path which makes the NRDU data path simulation server (100) dependent on specific modules. Unlike to the conventional methods and systems, the proposed method allows deployment of the data path as a socket API of the proprietary Linux server and achieve a high multi-Gbps throughput. Further, the proposed method can be deployed with minimum RAM requirement, minimum cores, and on any server system. Therefore, multiple DU simulators (182*a*-N) can be run in the same VM/Linux machine/BareMetal.

Figure 7:
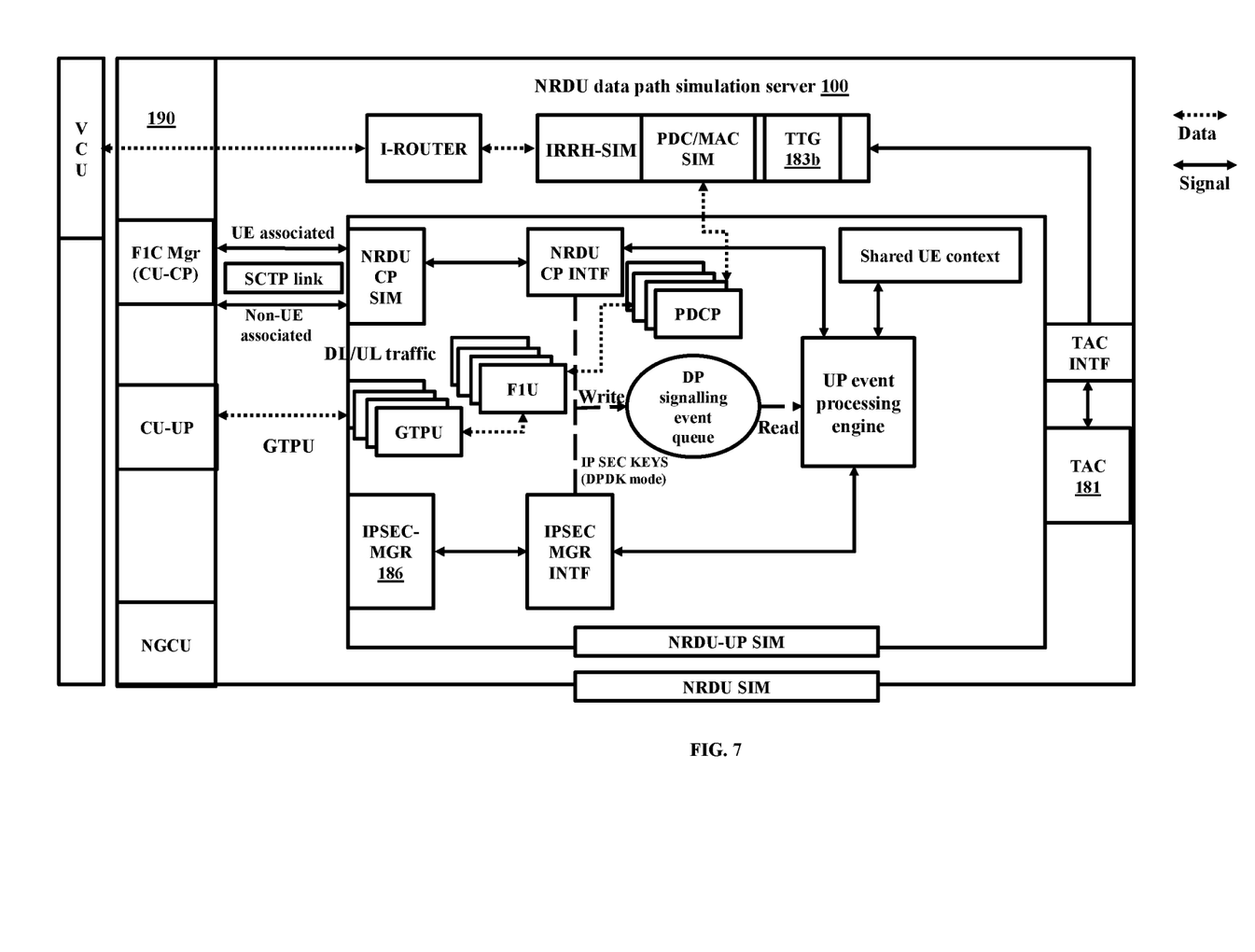
FIG. 7 illustrates the NRDU data path simulation server for non-standalone (NSA) mode deployment, according to an embodiment as disclosed herein.

FIG. 7 illustrates the NRDU data path simulation server (100) for non-standalone (NSA) mode deployment, according to an embodiment as disclosed herein.

Referring to the FIG. 7, the NRDU data path simulation server (100) is designed and implemented as a common application that it can be deployed to test the data plane functionality in both the NSA mode and the SA mode of operation of the NGCU (190).

The mode of deployment is configuration driven based on the need. If the NRDU data path simulation server (100) needs to be operated in the NSA mode of operation in the data path then the NRDU data path simulation server (100) needs the configuration so that the NGDU and UE NSA U-plane (Data Plane) stack are deployed.

The proposed NRDU data path simulation server (100) provides the below mentioned flexibility:
1. The NRDU data path simulation server (100) does not require dedicated hardware or Commercial off-the-shelf (COTS) hardware/Accelerator for implementation.
2. The NRDU data path simulation server (100) does not depend on any third-party fast path software like DPDK, VPP, OVS
3. The NRDU data path simulation server (100) does not require Linux kernel module integration. Therefore, the NRDU data path simulation server (100) can be deployed in any Linux server with general purpose processor.
4. The NRDU data path simulation server (100) is very light weight and flexible in terms of CPU and Memory usage.
5. The NRDU data path simulation server (100) is easy to port as it is based on Linux with General purpose processor.
6. The NRDU data path simulation server (100) can be deployed in Linux server, VM or Cloud (as POD)
7. The NRDU data path simulation server (100) can scale horizontally and vertically as per requirements to support high throughput if the hardware resource available
8. The NRDU data path simulation server (100) can be used for ENDC and SA data path simulation
9. The NRDU data path simulation server (100) includes built-in traffic generators, but it is designed in such a way that it can be integrated with 3rd party traffic Generator as well with very minimal changes
10. The NRDU data path simulation server (100) can simulate/support ~2.5 Gbps bi-directional traffic per Core (intel Ice-Lake processor) and simulates 15K UE Datapath endpoints as per the test KPIs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

We claim:

1. A new radio distributed unit (NRDU) data path simulation server for testing data throughput capacity in 5G communication network, wherein the NRDU data path simulation server comprises:
   a memory comprising a plurality of memory blocks;
   a processor coupled to the memory;
   a communicator coupled to the memory and the processor;
   wherein the processor comprises:
   a test controller configured to receive at least one testing profile for testing the data throughput capacity of a next generation central unit (NGCU);
   a distributed unit (DU) simulator configured to generate a plurality of simulated DUs and a plurality of simulated user equipments (UEs) based on the at least one testing profile, wherein each simulated DU of the plurality of simulated DUs comprises a plurality of entities based on the at least one testing profile;
   a traffic generator configured to generate a plurality of threads of data traffic required for testing the data throughput capacity of the NGCU, based on the at least one testing profile;
   a scheduler configured to schedule each thread of the plurality of threads to schedule access the plurality of entities of at least one simulated DU of the plurality of simulated DUs for optimizing the data throughput capacity of the NRDU data path simulation server; and
   a user plane (UP) controller configured to optimize the data throughput capacity of the NRDU data path simulation server by converging a data path of the plurality of simulated UEs and a data path of the plurality of simulated DUs using a socket buffer.

2. The NRDU data path simulation server as claimed in claim 1, wherein each thread of the plurality of threads is allocated at least one memory block of the plurality of memory blocks and wherein the at least one memory block is released by each thread on completion of an operation associated with each thread.

3. The NRDU data path simulation server as claimed in claim 1, wherein the plurality of entities comprises an UP event processing engine for controlling internal signaling of the NRDU data path simulation server and wherein the UP event processing engine is configured to enable at least one flag associated with a Packet Data Convergence Protocol (PDCP) manager and a Service Data Adaptation Protocol data path (SDAP) manager sequentially for enabling a flow of at least one of the data traffic and a running thread through the NRDU data path simulation server.

4. The NRDU data path simulation server as claimed in claim 1, wherein the scheduler comprises a DP signaling event queue and a timer for timing at least one operation associated the plurality of entities and the access of data associated the plurality of entities sequentially.

5. The NRDU data path simulation server as claimed in claim 1, wherein the NRDU data path simulation server further comprises an IP security Manager (IPSEC MGR) configured to simulate internet protocol (IPSEC) functionality between at least one simulated DU and the NGCU by encrypting at least one of a UP payload and a CP payload.

6. The NRDU data path simulation server as claimed in claim 1, wherein the traffic generator is at least one of a downlink (DL) traffic generator which is a source of DL traffic and an end point of UL traffic, and an uplink (UL) traffic generator which is a source of UL traffic and an end point of DL traffic.

7. A method for testing data throughput capacity in 5G communication network using a new radio distributed unit (NRDU) data path simulation server, wherein the method comprises:

receiving, by the NRDU data path simulation server, at least one testing profile associated with a next generation central unit (NGCU);

generating, by the NRDU data path simulation server, a plurality of simulated UEs and a plurality of simulated DUs based on the at least one testing profile, wherein a data path of the plurality of simulated UEs and a data path of the plurality of simulated DUs is converged using a socket buffer to optimize the data throughput capacity;

generating, by the NRDU data path simulation server, a plurality of threads of data traffic required for testing the data throughput capacity of the NGCU, based on the at least one testing profile;

scheduling, by the NRDU data path simulation server, each thread of the plurality of threads to access the plurality of entities of at least one simulated DU of the plurality of simulated DUs without contention between the plurality of threads; and testing, by the NRDU data path simulation server, the data throughput capacity of the NGCU based on the generated plurality of threads of the data traffic.

8. The method as claimed in claim 7, wherein each thread of the plurality of threads is allocated at least one memory block of a plurality of memory blocks of a memory of the NRDU data path simulation server and wherein the at least one memory block is released by each thread on completion of an operation associated with each thread.

9. The method as claimed in claim 8, wherein at least one flag associated with a Packet Data Convergence Protocol (PDCP) manager and a Service Data Adaptation Protocol data path (SDAP) manager is enabled sequentially to provide a flow of at least one of the data traffic and a running thread through the NRDU data path simulation server.

10. The method as claimed in claim 9, wherein timing at least one operation associated the plurality of entities and the access of data associated the plurality of entities sequentially.

* * * * *